Sept. 20, 1960

E. C. McRAE 2,953,039

ENGINE ACCESSORY DRIVE

Filed July 17, 1959

INVENTOR.
Edwin C. McRae

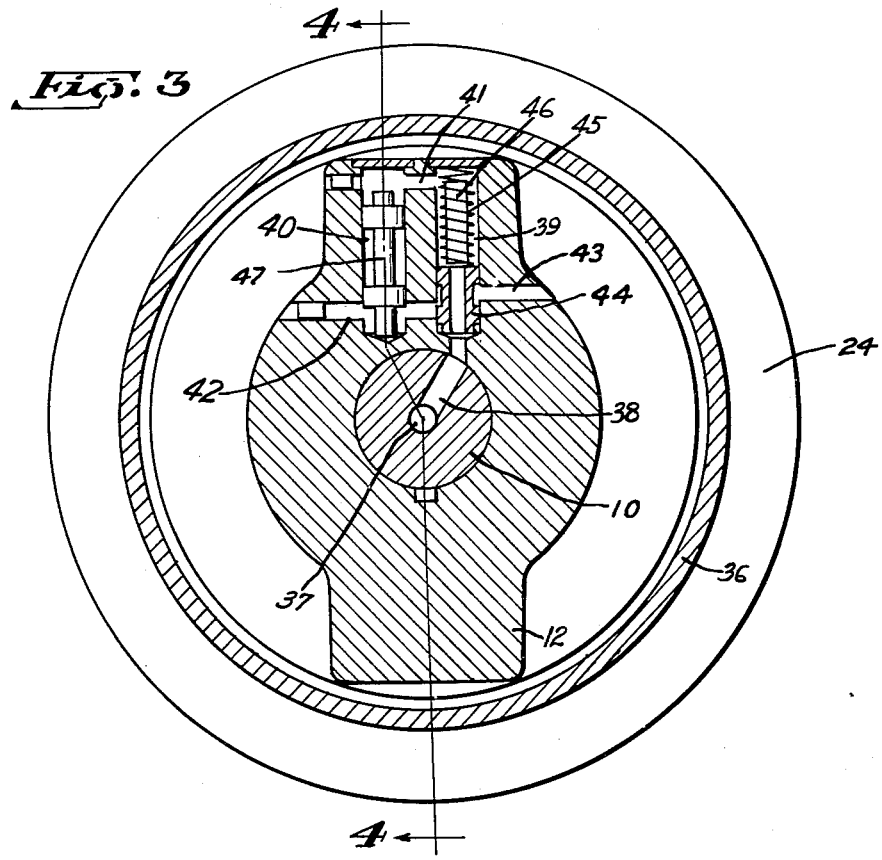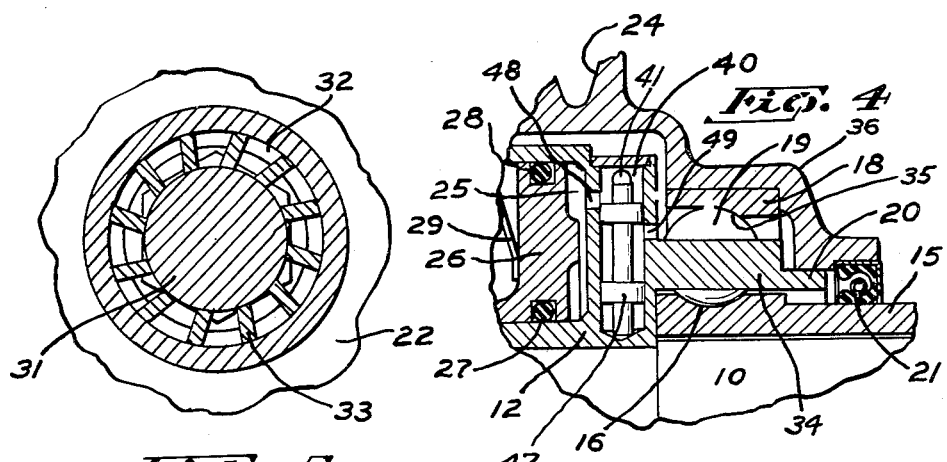

United States Patent Office 2,953,039
Patented Sept. 20, 1960

2,953,039
ENGINE ACCESSORY DRIVE
Edwin C. McRae, 3348 NE. 29th Ave., Pompano Beach, Fla.

Filed July 17, 1959, Ser. No. 827,941

16 Claims. (Cl. 74—752)

The object of my invention is to provide means for driving the accessories associated with an engine at two different speed ratios relative to the engine. Internal combustion engines normally employ a cooling fan and generator as accessories and often are equipped with a power steering pump and an air conditioner compressor. These accessories must be driven at sufficient speed when the engine is idling to function and consequently when the engine is operating at high speeds the accessories are driven at excessive speeds. The cooling fan is the greatest offender in this respect because the power requirements to operate any type of cooling fan increases as the cube of the speed at which the fan is being operated. Consequently, when the cooling fan is driven at a fixed speed ratio by the vehicle engine excessive cooling invariable results at high engine speeds.

My improved acccessory drive unit is arranged to drive the accessories at a high speed ratio when the engine is operating at speeds under 2,000 r.p.m. and when the engine is operating at speeds above 2,000 r.p.m. this speed the ratio is reduced so that the accessories then operate at a lower speed ratio. This does not necessarily mean that the accessories are driven at a slower rate of speed when the engine is operating at high speeds but only that their speeds are slower than they would be with a conventional fixed ratio drive.

A further object of my invention is to provide a two speed accessory drive unit wherein a driving pulley member is over-driven from the engine crankshaft at low engine speeds and wherein the same pulley is driven at crankshaft speed for high speed operation. The use of a single pulley which is driven at two different speed ratios simplifies the belt drive to the accessories over the type of drive which employs two separate driving pulleys of different diameters which are selectively coupled to the engine crankshaft.

Specifically, my invention comprises a planetary overdrive for operating the driving pulley at low engine speeds together with an overrunning clutch which drives the driving pulleys at crankshaft speeds when the engine is operating at high speeds.

Still a further object of my invention is to provide an improved centrifugally operated control for engaging and disengaging the planetary overdriver. While I have shown this control associated with my specific planetary drive it will be understood that it may be used to actuate any hydraulic piston which is to be controlled by the speed of rotation of the control member.

With these and other objects in view, my invention consists in the arrangement, construction and combination of the various parts of my improved device, as described in this specification, claimed in my claims, and illustrated in the accompanying drawings, in which:

Figure 3 is a sectional view, taken upon the line 3—3 of Figure 1.

Figure 4 is a sectional view, taken upon the line 4—4 Figure 3, and

Figure 5 is a sectional view, taken upon line 5—5 of Figure 1.

Figure 1:
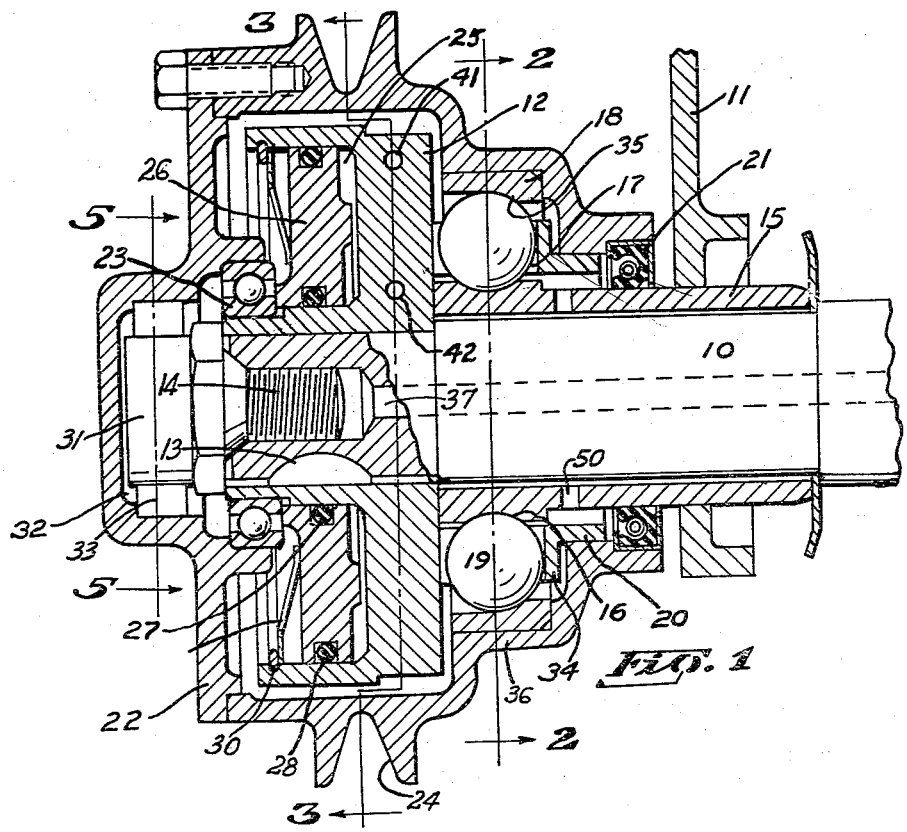
Figure 1 is a vertical, central sectional view through the front of an engine crankshaft having my improved driving unit mounted thereon.
Figure 2:
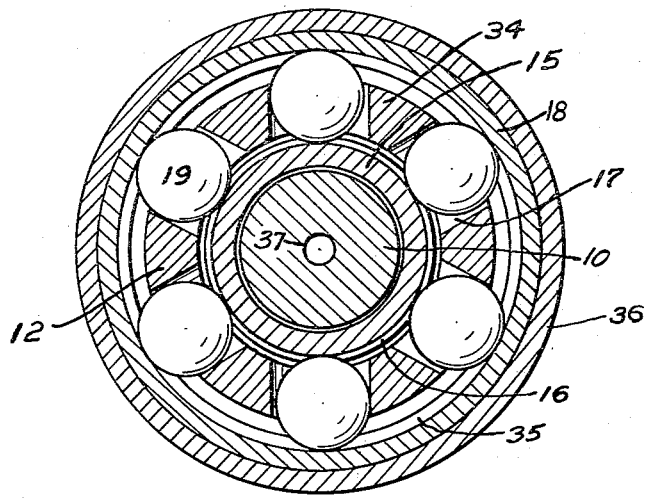
Figure 2 is a sectional view, taken upon the line 2—2 of Figure 1.

Referring to the accompanying drawings, I have used the reference numeral 10 to indicate an internal combustion engine crankshaft. The crankshaft 10 projects forwardly through the front end of the engine, the front wall of which has been given the reference numeral 11. A combined driving member and bearing cage 12 is fixedly secured to the outermost end of the crankshaft 10 by means of a driving key 13 and a retaining stud 14. The stud 14 is screwed into the end of the crankshaft with a left hand thread so that the clockwise rotation of the crankshaft will tend to tighten the stud in place rather than to loosen it. This is important because high speed operations of the drive is taken through this stud 14.

A sleeve 15 is fixed to the front wall 11 of the engine and extends from this wall forwardly to the driving member 12. The sleeve serves as reaction member for the planetary drive. A bearing race 16 is formed in the forward end of the sleeve 15, which race is axially aligned with an annulus of bearing receiving openings 17 which are formed in an annular rearwardly extending portion 34 of the member 12. An outer bearing race 18 is mounted in axial alignment with the openings 17 and a spherical bearing 19 is inserted in each of the openings 17. These bearings are held in position by the cage 12 and extend between the inner race 16 and outer race 18.

The driving unit, just described, has been termed a bearing member because it is almost identical to a conventional single row ball bearing unit. However, in this installation it serves primarily as a friction overdrive element and only incidentally as a bearing member.

It will be noted from Figure 1 that the outer race 18 is formed with an inwardly extending spherical shoulder on only the right hand side so that the race 18 may be moved towards the right without interference from ball members 19. However, any attempt to move the race 18 towards the left will wedge the ball members between the races. The race 18 is enlarged a few thousandths of an inch over that required in a conventional ball bearing assembly so that when no axial pressure is applied to the race 18 in a direction towards the left the ball members 19 and race 18 may freely rotate relative to each other with little or no friction between the elements. However, when axial pressure is applied to the race 18 in a direction towards the left the ball members 19 will be wedged between the shoulder 35 and the inner race 16 but the members may rotate the same as with any ball bearing assembly. However, in this case the relative speeds of rotation of the cage and outer race will be fixed by the diameters of the bearings 19 and the races 16 and 18. In the construction shown, rotation of the crankshaft and bearing cage through one revolution will cause the outer race 18 to rotate in the same direction but through substantially 1⅔ revolutions. When axial pressure is applied to the outer race, the unit functions the same as a planetary gear drive, but when the pressure is relieved the outer race and bearing cage can rotate freely and independently of each other.

The outer race 18 is fixedly secured in a housing member 36, one end of which is rotatably mounted upon an annular extension 20 which projects from the bearing cage 12. An oil seal 21 is fixed in the housing 36 and bears against the sleeve 15 so as to prevent oil within the housing from leaking out around the sleeve 15. The other end of the housing 36 is closed by means of a plate 22, which plate is rotatably mounted upon the member 12 by means of a ball thrust bearing assembly 23. A V belt pulley groove 24 is machined in the periphery of the housing 19 and a V belt, not shown in the drawings, extends from around pulley groove and suitable pulley associate with the accessories of the engine.

The plate 22, housing 36 and race 18 are fixed as a unit, from which it will be seen that axial movement of the plate 22 to the left from the position shown in Figure 1 will engage the frictional drive and cause the pulley 24 to be rotated at about 1⅔ crankshaft speed.

In order to so move the plate 22, I have provided an annular cylinder 25 in the member 12 and an annular piston 26 is reciprocally mounted within the cylinder 25. Inner and outer O rings 27 and 28, respectively, are inserted in suitable grooves in the piston 26 to prevent leakage of oil between the piston and cylinder. A spring washer 29 is fixed in the open end of the cylinder 25 by means of a snap ring 30, which washer urges the piston 26 inwardly in the cylinder 25. The center portion of the piston 26 bears against the inner member of the bearing assembly 23 so that when oil is applied under pressure to the cylinder 25 the piston 26 will be urged against the force of the washer 29 to move the plate 22 and bearing race 18 relative to the cage 12. This will engage the friction drive. If at this time the crankshaft is rotating the housing 36 the pulley 24 will be driven at about 1⅔ crankshaft speed. At this time the radical load produced by the V belt on the pulley 24, will be taken by the bearing assembly 23 and the balls 19. The housing 36 will rotate upon the extension 20 but this extension will carry no load.

When the oil pressure in the cylinder 25 is discontinued the axial pressure on the outer race will be relieved so that the friction drive unit will be disengaged. In order that pulley 24 may be driven at crankshaft speed when the friction drive is disengaged, I have provided an over-running clutch of the sprag type, as shown in Figure 5. An annular extension 31 is formed on the stud 14 which projects into a cup shaped recess 32 formed in the center portion of the plate 22. A plurality of sprags 33 are inserted in the space between the extension 31 and the cup member 32 so that when the extension 31 is driven clockwise by the engine crankshaft the sprags will drive the plate 22 at crankshaft speed. The sprag clutch will not be described in detail because these clutches are a common commodity and any other type of over-running clutch may be employed instead of the sprag type shown.

The planetary drive mechanism is engaged shortly after the engine starts operating and stays in engagement until it attains a speed of about 2,000 r.p.m. In order that it may then be disengaged I have provided the control valve illustrated in Figures 3 and 4. It will be noted from Figure 3, that the crankshaft 10 is provided with an axial bore 37 which is connected to the oil pressure gallery of the engine. The outer end of this bore 37 is closed by the stud 14. A radial port 38 extends from the bore 37 and terminates at the member 12. It will also be noted from Figure 3, that the member 12 is provided with a radial extending bore 39, the inner end of which communicates with the port 38. A shuttle valve bore 40 is also provided in the member 12 alongside of the bore 39. The outer ends of the bores 39 and 40 are connected by means of a passageway 41 and a passageway 42 connects the bores 39 and 40 at a point spaced slightly above the inner ends thereof. An exhaust port 43 extends from the bore 39 to the outside of the member 12 and is positioned slightly above the point where the passageway 42 intersects the bore 39. A centrifugally operated spool valve 44 is reciprocally mounted in the bore 39 and is urged inwardly by means of a compression spring 45. A spacer 46 is loosely mounted within the spring 45 and functions to limit the radical travel of the spool valve 44 due to centrifugal force. The valve 44 has an axial opening therethrough and is provided with lands on each end thereof. The inner land is substantially the same width as the diameter of the passageway 42.

The bore 40 is provided with a shuttle valve 47 which in its innermost position uncovers a passageway 48 leading from the bore 40 into the cylinder 25. In the outermost position of the valve 47 the passageway 48 is connected to an exhaust post 49. When the valve 47 is in its innermost position the cylinder 25 is connected to the bore 40 and when the valve 47 is in its outermost position the cylinder 25 is connected to the exhaust post 49.

In operation, the spring 45 forces the spool valve 44 to its innermost position where it is retained until a speed of around 2000 r.p.m. is reached. The fluid under pressure in the port 38 flows freely through the sleeve valve 44 and port 39 and then through the passageway 41 into the bore 40. The fluid pressure acts upon the outer end of the shuttle valve 47, and inasmuch as its inner end is in communication with the passageway 42 the shuttle valve is forced inwardly. The passageway 42 is connected by the spool valve 44 with the exhaust passageway 43 so that no pressure can build up beneath the shuttle valve. The hydraulic pressure applied against the outer end of the valve 47 is sufficient to maintain it in its innermost position against the maximum centrifugal force developed by the engine.

When the engine speed reaches approximately 2000 r.p.m. the spool valve 44 gradually moves radially outwardly, due to centrifugal force, against the pressure of the spring 45. The passageway 42 is just closed by the inner land of the spool valve and is then opened to the pressure within the bore 39. When this occurs the pressure on the ends of the valve 47 is equalized so that centrifugal force immediately throws the shuttle valve radially through its full range of movement. This shuts off the oil under pressure to the passageway 48 and connects this passageway to the exhaust port 49.

The advantage of using a shuttle type valve for controlling the admission and discharge of oil from the cylinder 25 is that such a valve is either on or off and can never stay in an intermediate position. The spool valve 44 may move only a fraction of an inch upon a slight increase of engine speed but this very small movement is sufficient to control the action of the shuttle valve. If the cylinder pressure were controlled directly by the valve 44, the pressure within the cylinder might only be partially applied which, while sufficient to move the piston against the action of the spring washer 29, would not be sufficient to carry the torque required in driving the vehicle accessories. With the shuttle valve construction shown movement of the spool valve 44 sufficient to apply any pressure to the outer end of the shuttle valve will cause the valve to travel through its full range without further movement of the spool valve. This type of cylinder control valve is believed to be new and may be utilized in other installations where it is desired to control a hydraulic cylinder by a centrifugally actuated valve.

In the operation of my improved drive, the engine is first started and oil pressure immediately builds up in the bore 37. This pressure is applied to the piston 26 which moves the housing 36 axially to engage the friction planetary drive. The pulley 24 is thus driven at about one and two thirds crankshaft speed. When 2000 r.p.m. is reached the valve 44 moves outwardly sufficient to actuate the shuttle valve 47. The fluid in the cylinder 25 is then discharged and the fritcion drive disengaged. The pulley 24 is then driven at crankshaft speed by the over-running clutch 33. Discharged oil within the housing 36 is conducted back into the engine through ports 50 in the sleeve 15.

The advantage of the accessory drive shown and described herein resides in its relatively simple construction and the fact that a single driving pulley is utilized.

Some changes may be made in the arrangement, construction and combination of the various parts of my improved device without departing from the spirit of my invention, and it is my intention to cover by my claims

I claim as my invention:

1. An engine accessory drive adapted to drive an engine accessory at two different speed ratios from a drive shaft associated with said engine, comprising, a driving member fixed to said shaft, planet members rotatably mounted in said driving member, an inner annular reaction member, an outer annular driven member, said inner and outer annular members together with said planet members comprising a three element planetary drive, means for holding said inner annular member from rotation, means for driving said accessory from said outer annular member, means for rendering said planetary drive ineffective to drive said outer annular member, and an over-running clutch arranged to drive said outer annular member from said drive shaft when said planetary drive is ineffective.

2. A device, as claimed in claim 1, wherein said planetary drive depends upon friction between said members for effecting said drive.

3. A device, as claimed in claim 1, wherein said planetary drive elements comprise an inner bearing race and outer bearing race and a plurality of bearing members positioned between said races.

4. An engine accessory drive adapted to drive an engine accessory at two different speed ratios from a drive shaft associated with said engine comprising, a bearing cage having a plurality of planet bearings rotatably mounted therein, an inner bearing race, an outer bearing race, said planet bearings and said races comprising three elements of a planeary frictional drive, one element of which is held from rotation and another element of which is connected to said shaft and the third element of which drives said accessory, said bearing members and said races being in substantial axial alignment and being so proportioned that when so aligned practically no friction is developed between said members and said races; means for operatively moving one of said elements axially relative to the other two elements to effect said frictional drive, and means for coupling said third element to said shaft when no friction is being developed by said frictional drive.

5. A device, as claimed in claim 4, wherein said means for coupling said third element to said shaft comprises an over-running clutch.

6. A device, as claimed in claim 4, wherein said bearing cage is fixed to said drive shaft and said inner race is held from rotation and said outer race comprises said third element which drives said accessory.

7. A device, as claimed in claim 4, wherein said means for operatively moving one of said elements axially relative to the other two elements comprises a fluid actuated piston connected to said outer races.

8. A device, as claimed in claim 4, wherein said means for operatively moving one of said elements axially relative to the other two elements comprises a fluid actuated piston which is actuated by fluid pressure generated by said engine.

9. A device, as claimed in claim 4, wherein said planet bearings comprise ball members which roll in spherical grooves in said races.

10. A device, as claimed in claim 4, wherein said planet bearings comprise ball members which roll in spherical grooves in said races and wherein said outer race is moved axially to effect said frictional drive.

11. A device, as claimed in claim 4, wherein said frictional drive is an over-drive relative to said shaft.

12. An engine accessory drive adapted to drive an engine accessory at two different speed ratios from a drive shaft associated with said engine, comprising, a bearing cage having a plurality of ball bearings rotatably mounted therein, said cage being fixed to said shaft, an inner ball race in axial alignment with said ball bearing, said ball race being fixed against rotation, an outer ball race mounted in axial alignment with said inner ball race, said cage member having a cylinder formed therein, a piston in said cylinder, which upon the application of fluid pressure in said cylinder moves said outer ball race axially to effect a frictional drive from said cage member to said outer ball race, and means for coupling said outer ball race to said shaft when said fluid pressure is not being applied.

13. A device, as claimed in claim 12, wherein said outer ball race is supported upon a pulley housing which encloses said cage member and said frictional drive.

14. A device, as claimed in claim 12, wherein said means for coupling said outer ball race to said shaft comprises an over-running clutch.

15. A device, as claimed in claim 12, wherein application of fluid pressure in said cylinder is controlled by the speed of rotation of said shaft.

16. An engine accessory drive adapted to drive an engine accessory at two different speed ratios from a rotatable member driven by said engine, comprising, a driving member fixed to said rotatable member, planet members rotatably mounted in said driving member, an inner annular reaction member, an outer annular driven member, said inner and outer annular members together with said planet members comprising a three element planetary drive, means for holding said inner annular member from rotation, means for driving said accessory from said outer annular member, means for rendering said planetary drive ineffective to drive said outer annular member, and an over-running clutch arranged to drive said outer annular member from said driving member when said planetary drive is ineffective.

References Cited in the file of this patent

UNITED STATES PATENTS

| | | |
|---|---|---|
| 2,711,749 | Hettinger | June 28, 1955 |
| 2,868,038 | Billeter | Jan. 13, 1959 |
| 2,874,592 | Oehrli | Feb. 24, 1959 |
| 2,876,784 | Adams | Mar. 10, 1959 |